(12) United States Patent
Russell

(10) Patent No.: US 8,725,184 B2
(45) Date of Patent: May 13, 2014

(54) CHARACTER ENABLEMENT IN SHORT MESSAGE SERVICE

(75) Inventor: Nicholas James Russell, Slough (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/204,124

(22) Filed: Aug. 5, 2011

(65) Prior Publication Data
US 2013/0035121 A1    Feb. 7, 2013

(51) Int. Cl.
H04W 4/00    (2009.01)
H04M 1/66    (2006.01)

(52) U.S. Cl.
USPC .......................................... 455/466; 455/411

(58) Field of Classification Search
CPC ....... H04W 4/14; H04W 4/00; H04L 12/5835
USPC ......................................................... 455/466
See application file for complete search history.

(56) References Cited

U.S. PATENT DOCUMENTS

| | | | | |
|---|---|---|---|---|
| 6,597,917 | B1 * | 7/2003 | Meuronen | 455/466 |
| 2004/0008723 | A1 * | 1/2004 | Uchida et al. | 370/466 |
| 2008/0090597 | A1 * | 4/2008 | Celik et al. | 455/466 |
| 2011/0165860 | A1 * | 7/2011 | Cai et al. | 455/411 |
| 2011/0165895 | A1 * | 7/2011 | Ryan | 455/466 |

OTHER PUBLICATIONS

3GPP TS 23.038 V10.0.0; 3rd Generation Partnership Project; Technical Specification Group Core Network and Terminals; Alphabets and Language-Specific Information; Release 10; Mar. 2011; 56 pages.
3GPP TS 23.040 V10.0.0; 3rd Generation Partnership Project; Technical Specification Group Core Network and Terminals; Technical Realization of the Short Message Service (SMS); Release 10; Mar. 2011; 202 pages.
3GPP TS 24.008 V10.3.0; 3rd Generation Partnership Project; Technical Specification Group Core Network and Terminals; Mobile Radio Interface Layer 3 Specification; Core Network Protocols; Stage 3; Release 10; Jun. 2011; 384 pages.
3GPP TS 24.011 V10.0.0; 3rd Generation Partnership Project; Technical Specification Group Core Network and Terminals; Point-to-Point (PP) Short Message Service (SMS) Support on Mobile Radio Interface; Release 10; Feb. 2011; 108 pages.
3GPP TS 24.301 V10.3.0; 3rd Generation Partnership Project; Technical Specification Group Core Network and Terminals; Non-Access-Stratum (NAS) Protocol for Evolved Packet System (EPS); Stage 3; Release 10; Jun. 2011; 316 pages.

(Continued)

*Primary Examiner* — Timothy Pham
(74) *Attorney, Agent, or Firm* — Conley Rose, P.C.; Maria L. Sekul; J. Robert Brown, Jr.

(57) ABSTRACT

A method is provided for encoding characters that specify a source address of an SMS message. The method comprises modifying a type of address field within an originating address field, the modification indicative of an encoding scheme used for the source address of the SMS message.

12 Claims, 13 Drawing Sheets

(56) References Cited

OTHER PUBLICATIONS

3GPP TS 29.002 V10.3.0; 3rd Generation Partnership Project; Technical Specification Group Core Network and Terminals; Mobile Application Part (MAP) Specification; Release 10; Jun. 2011; 952 pages.
Crocker, David H.; "Standard for the Format of ARPA Internet Text Messages"; RFC #822; Aug. 13, 1982; 49 pages.
Moore, K.; "MIME (Multipurpose Internet Mail Extensions) Part Three: Message Header Extensions for Non-ASCII Text"; RFC #2047; Nov. 1996; 15 pages.
Freed, N., et al.; "MIME Parameter Value and Encoded Word Extensions: Character Sets, Languages, and Continuations"; RFC #2184; Aug. 1997; 10 pages.
Freed, N., et al.; "MIME Parameter Value and Encoded Word Extensions: Character Sets, Languages, and Continuations"; RFC #2231; Nov. 1997; 11 pages.
ISO/IEC International Standard; "Information Technology—Universal Coded Character Set (UCS)"; ISO/IEC 10646; Second Edition; 2010; 130 pages.
PCT International Search Report; Application No. PCT/EP2012/065155; Jan. 8, 2013; 6 pages.
PCT Written Opinion of the International Searching Authority; Application No. PCT/EP2012/065155; Jan. 8, 2013; 10 pages.
Buckley, Adrian, et al., U.S. Appl. No. 13/747,207, filed Jan. 22, 2013; Title: Enhancing Short Message Service Addressing and Routing.
ISO/IEC International Standard; "Information Technology—Universal Coded Character Set (UCS)"; ISO/IEC 10646; Third Edition; 2012; 142 pages.
ITU-T; "Series E: Overall Network Operation, Telephone Service, Service Operation and Human Factors, International Operation—Numbering Plan of the International Telephone Service, The International Public Telecommunication Numbering Plan"; E.164; Nov. 2010; 32 pages.
SMPP Developers Forum; Short Message Peer to Peer Protocol Specification V3.4; Issue 1.2; Oct. 12, 1999; 169 pages.
Eidnes, H., et al.; "Classless IN-ADDR.ARPA Delegation"; RFC 2317; Mar. 1998; 10 pages.
Rigney, C., et al.; "Remote Authentication Dial in User Service (RADIUS)"; RFC 2865; Jun. 2000; 76 pages.
Rigney, C.; "RADIUS Accounting"; RFC 2866; Jun. 2000; 28 pages.
Rosenberg, J., et al.; "SIP: Session Initiation Protocol"; RFC 3261; Jun. 2002; 252 pages.
Campbell, B., et al.; "Session Initiation Protocol (SIP) Extension for Instant Messaging"; RFC 3428; Dec. 2002; 17 pages.
Garcia-Martin, M., et al.; "Private Header (P-Header) Extensions to the Session Initiation Protocol (SIP) for the 3rd-Generation Partnership Project (3GPP)"; RFC 3455; Jan. 2003; 34 pages.
Calhoun, P.; "Diameter Base Protocol"; RFC 3588; Sep. 2003; 147 pages.
Loughney, J.; "Diameter Command Codes for Third Generation Partnership Project (3GPP) Release 5"; RFC 3589; Sep. 2003; 5 pages.
Thomson, S., et al.; "DNS Extensions to Support IP Version 6"; RFC 3596; Oct. 2003; 8 pages.
Calhoun, P., et al.; "Diameter Network Access Server Application"; RFC 4005; Aug. 2005; 85 pages.
Aboba, B., et al.; "The Network Access Identifier"; RFC 4282; Dec. 2005; 16 pages.
Jennings, C., et al.; "Session Initiation Protocol (SIP) URIs for Applications Such as Voicemail and Interactive Voice Response (IVR)"; RFC 4458; Apr. 2006; 20 pages.
Garcia-Martin, M., et al.; "Diameter Session Initiation Protocol (SIP) Application"; RFC 4740; Nov. 2006; 72 pages.
3GPP2; 3rd Generation Partnership Project 2; "Short Message Service over IMS"; 3GPP2 X.S0048-0; Version 1.0; Nov. 2007; 54 pages.
3GPP2; 3rd Generation Partnership Project 2; "Mobile Application Part (MAP)—SMS"; 3GPP2 X.S0004-641-E; Version 2.0; Jul. 2007; 59 pages.
3GPP TR 22.988 V1.0.0; 3rd Generation Partnership Project; Technical Specification Group Services and System Aspects; Study on Alternatives to E.164 for Machine-Type Communications; Release 10; Sep. 2010; 20 pages.
3GPP TS 23.003 V11.0.0; 3rd Generation Partnership Project; Technical Specification Group Core Network and Terminals; Numbering, Addressing and Identification; Release 11; Dec. 2011; 81 pages.
3GPP TS 23.040 V11.0.0; 3rd Generation Partnership Project; Technical Specification Group Core Network and Terminals; Technical Realization of the Short Message Service (SMS); Release 11; Dec. 2011; 202 pages.
3GPP TS 23.078 V11.1.0; 3rd Generation Partnership Project; Technical Specification Group Core Network and Terminals; Customised Applications for Mobile Network Enhanced Logic (CAMEL) Phase 4; Stage 2; Release 11; Dec. 2011; 748 pages.
3GPP TS 23.204 V11.1.0; 3rd Generation Partnership Project; Technical Specification Group Services and System Aspects; Support of Short Message Service (SMS) Over Generic 3GPP Internet Protocol (IP) Access; Stage 2; Release 11; Sep. 2011; 53 pages.
3GPP TR 23.863 V1.0.0; 3rd Generation Partnership Project; Technical Specification Group Services and System Aspects; Support of Short Message Service (SMS) in IMS Without MSISDN; Stage 2; Release 11; Dec. 2011; 56 pages.
3GPP TS 24.008 V11.1.0; 3rd Generation Partnership Project; Technical Specification Group Core Network and Terminals; Mobile Radio Interface Layer 3 Specification; Core Network Protocols; Stage 3; Release 11; Dec. 2011; 654 pages.
3GPP TS 24.301 V11.1.0; 3rd Generation Partnership Project; Technical Specification Group Core Network and Terminals; Non-Access-Stratum (NAS) Protocol for Evolved Packet System (EPS); Stage 3; Release 11; Dec. 2011; 326 pages.
3GPP TS 24.341 V11.0.0; 3rd Generation Partnership Project; Technical Specification Group Core Network and Terminals; Support of SMS Over IP Networks; Stage 3; Release 11; Sep. 2011; 30 pages.
3GPP TS 29.002 V11.1.0; 3rd Generation Partnership Project; Technical Specification Group Core Network and Terminals; Mobile Application Part (MAP) Specification; Release 11; Dec. 2011; 954 pages.
3GPP TS 29.078 V11.1.0; 3rd Generation Partnership Project; Technical Specification Group Core Network and Terminals; Customised Applications for Mobile Network Enhanced Logic (CAMEL) Phase 4; CAMEL Application Part (CAP) Specification; Release 11; Dec. 2011; 221 pages.
3GPP TS 29.172 V10.1.0; 3rd Generation Partnership Project; Technical Specification Group Core Network and Terminals; Location Services (LCS); Evolved Packet Core (EPC) LCS Protocol (ELP) Between the Gateway Mobile Location Centre (GMLC) and the Mobile Management Entity (MME); SLg Interface; Release 10; Sep. 2011; 25 pages.
3GPP TS 29.228 V11.2.0; 3rd Generation Partnership Project; Technical Specification Group Core Network and Terminals; IP Multimedia (IM) Subsystem Cx and Dx Interfaces; Signalling Flows and Message Contents; Release 11; Dec. 2011; 71 pages.
3GPP TS 29.229 V11.0.0; 3rd Generation Partnership Project; Technical Specification Group Core Network and Terminals; Cx and Dx Interfaces Based on the Diameter Protocol; Protocol Details; Release 11; Dec. 2011; 37 pages.
3GPP TS 29.272 V11.1.0; 3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol; Release 11; Dec. 2011; 98 pages.
3GPP TS 29.329 V11.1.0; 3rd Generation Partnership Project; Technical Specification Group Core Network and Terminals; Sh Interface Based on the Diameter Protocol; Protocol Details; Release 11; Dec. 2011; 22 pages.
3GPP TS 29.336 V11.1.0; 3rd Generation Partnership Project; Technical Specification Group Core Network and Terminals; Home Subscriber Server (HSS) Diameter Interfaces for Interworking with Packet Data Networks and Applications; Release 11; Dec. 2012; 21 pages.

(56) References Cited

OTHER PUBLICATIONS

3GPP TS 29.338 V11.0.0; 3rd Generation Partnership Project; Technical Specification Group Core Network and Terminals; Diameter Based Protocols to Support Short Message Service (SMS) Capable Mobile Management Entities (MMEs); Release 11; Dec. 2012; 40pages.

3GPP TS 33.204 V10.0.0; 3rd Generation Partnership Project; Technical Specification Group Core Services and System Aspects; 3G Security; Network Domain Security (NDS); Transaction Capabilities Application Part (TCAP) User Security; Release 10; Mar. 2011; 24 pages.

PCT Written Opinion of the International Preliminary Examining Authority; Application No. PCT/EP2012/065155; Nov. 25, 2013; 6 pages.

PCT International Preliminary Report on Patentability; Application No. PCT/EP2012/065155; Jan. 21, 2014; 13 pages.

* cited by examiner

TP-OA field

320

| Type-of-Number | | | | |
|---|---|---|---|---|
| Bits | 6 | 5 | 4 | |
| | 0 | 0 | 0 | Unknown[(1)] |
| | 0 | 0 | 1 | International number[(2)] |
| | 0 | 1 | 0 | National Number[(3)] |
| | 0 | 1 | 1 | Network specific number[(4)] |
| | 1 | 0 | 0 | Subscriber number[(5)] |
| | 1 | 0 | 1 | Alphanumeric (coded according to 3GPP TS 23.038 GSM 7-bit default alphabet) |
| | 1 | 1 | 0 | Abbreviated number |
| | 1 | 1 | 1 | Reserved for extension |

350 → (Alphanumeric row)
340 → (Reserved for extension row)

(1) "Unknown" is used when the user or network has no a priori information about the numbering plan. In this case, the Address-Value field is organized according to the network dialing plan, e.g. prefix or escape digits might be present.

(2) The international format shall be accepted also when the message is destined to a recipient in the same country as the MSC or as the SGSN.

(3) Prefix or escape digits shall not be included.

(4) "Network specific number" is used to indicate administration/service number specific to the serving network, e.g. used to access an operator.

(5) "Subscriber number" is used when a specific short number representation is stored in one or more SCs as part of a higher layer application. (Note that "Subscriber number" shall only be used in connection with the proper PID referring to this application).

| Numbering-Plan-Identification | | | | | |
|---|---|---|---|---|---|
| Bits | 3 | 2 | 1 | 0 | |
| | 0 | 0 | 0 | 0 | Unknown |
| | 0 | 0 | 0 | 1 | ISDN/telephone numbering plan (E.164/E.163) |
| | 0 | 0 | 1 | 1 | Data numbering plan (X.121) |
| | 0 | 1 | 0 | 0 | Telex numbering plan |
| | 0 | 1 | 0 | 1 | Service Centre Specific plan[1] |
| | 0 | 1 | 1 | 0 | Service Centre Specific plan[1] |
| | 1 | 0 | 0 | 0 | National numbering plan |
| | 1 | 0 | 0 | 1 | Private numbering plan |
| | 1 | 0 | 1 | 0 | ERMES numbering plan (ETSI DE/PS 3 01-3) |
| | 1 | 1 | 1 | 1 | Reserved for extension |
| | All other values are reserved | | | | |
| (1) "Service Center specific number" is used to indicate a numbering plan specific to External Short Message Entities attached to the SMSC. | | | | | |

| Type-of-Number | | | | |
|---|---|---|---|---|
| Bits | 6 | 5 | 4 | |
| | 0 | 0 | 0 | Unknown[1] |
| | 0 | 0 | 1 | International number[2] |
| | 0 | 1 | 0 | National Number[3] |
| | 0 | 1 | 1 | Network specific number[4] |
| | 1 | 0 | 0 | Subscriber number[5] |
| | 1 | 0 | 1 | Alphanumeric (coded according to 3GPP TS 23.038 GSM 7-bit default alphabet) |
| | 1 | 1 | 0 | Abbreviated number |
| | 1 | 1 | 1 | Alphanumeric, (coded according to UCS2) |

440

(1) "Unknown" is used when the user or network has no a priori information about the numbering plan. In this case, the Address-Value field is organized according to the network dialing plan, e.g. prefix or escape digits might be present.

(2) The international format shall be accepted also when the message is destined to a recipient in the same country as the MSC or as the SGSN.

(3) Prefix or escape digits shall not be included.

(4) "Network specific number" is used to indicate administration/service number specific to the serving network, e.g. used to access an operator.

(5) "Subscriber number" is used when a specific short number representation is stored in one or more SCs as part of a higher layer application. (Note that "Subscriber number" shall only be used in connection with the proper PID referring to this application).

Figure 3

The Type-of-Address field format is as follows for ToN values 000-110:
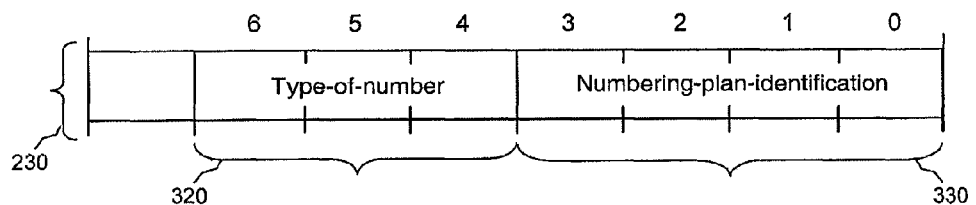
The Type-of-Address field format is as follows for ToN value 111:
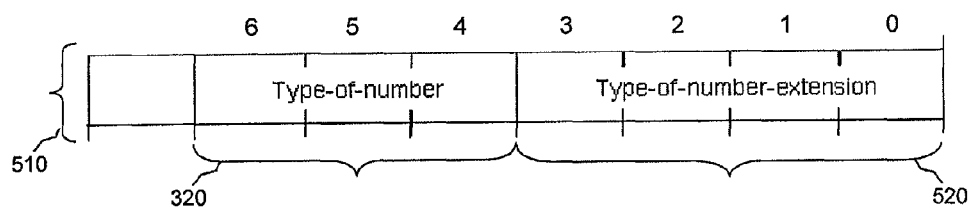
Figure 4a
| Type-of-Number-Extension |||||
|---|---|---|---|---|
| Bits | 3 | 2 | 1 | 0 |
|  | 0 | 0 | 0 | 0 | Alphanumeric (coded according to UCS2) |
|  | 1 | 1 | 1 | 1 | Reserved for extension |
| All other values are reserved |||||
Figure 4b

| Type-of-Number ||||
|---|---|---|---|
| Bits | 6 | 5 | 4 |
| | 0 | 0 | 0 | Unknown[1] |
| | 0 | 0 | 1 | International number[2] |
| | 0 | 1 | 0 | National Number[3] |
| | 0 | 1 | 1 | Network specific number[4] |
| | 1 | 0 | 0 | Subscriber number[5] |
| | 1 | 0 | 1 | Alphanumeric (coded according to NPI value) |
| | 1 | 1 | 0 | Abbreviated number |
| | 1 | 1 | 1 | Reserved for extension |

(1) "Unknown" is used when the user or network has no a priori information about the numbering plan. In this case, the Address-Value field is organized according to the network dialing plan, e.g. prefix or escape digits might be present.

(2) The international format shall be accepted also when the message is destined to a recipient in the same country as the MSC or as the SGSN.

(3) Prefix or escape digits shall not be included.

(4) "Network specific number" is used to indicate administration/service number specific to the serving network, e.g. used to access an operator.

(5) "Subscriber number" is used when a specific short number representation is stored in one or more SCs as part of a higher layer application. (Note that "Subscriber number" shall only be used in connection with the proper PID referring to this application).

Figure 5

| Numbering-Plan-Identification |||||
|---|---|---|---|---|
| Bits | 3 | 2 | 1 | 0 | |
| | 0 | 0 | 0 | 0 | Unknown/Address-Value encoded according to 3GPP TS 23.038 GSM 7-bit default alphabet |
| | 0 | 0 | 0 | 1 | ISDN/telephone numbering plan (E.164/E.163) |
| | 0 | 0 | 1 | 1 | Data numbering plan (X.121) |
| | 0 | 1 | 0 | 0 | Telex numbering plan |
| | 0 | 1 | 0 | 1 | Service Centre Specific plan[1] |
| | 0 | 1 | 1 | 0 | Service Centre Specific plan[1] |
| | 1 | 0 | 0 | 0 | National numbering plan |
| | 1 | 0 | 0 | 1 | Private numbering plan |
| | 1 | 0 | 1 | 0 | ERMES numbering plan (ETSI DE/PS 3 01-3) |
| | 1 | 0 | 1 | 1 | Address-Value encoded according to UCS2 |
| | 1 | 1 | 1 | 1 | Reserved for extension |
| | All other values are reserved |||||
| (1) "Service Center specific number" is used to indicate a numbering plan specific to External Short Message Entities attached to the SMSC. |||||

Figure 6a

| Numbering-Plan-Identification ||||| |
|---|---|---|---|---|---|
| Bits | 3 | 2 | 1 | 0 | |
| | 0 | 0 | 0 | 0 | Unknown/Address-Value encoded according to 3GPP TS 23.038 GSM 7-bit default alphabet |
| | 0 | 0 | 0 | 1 | ISDN/telephone numbering plan (E.164/E.163) |
| | 0 | 0 | 1 | 1 | Data numbering plan (X.121) |
| | 0 | 1 | 0 | 0 | Telex numbering plan |
| | 0 | 1 | 0 | 1 | Service Centre Specific plan[(1)] |
| | 0 | 1 | 1 | 0 | Service Centre Specific plan[(1)] |
| | 1 | 0 | 0 | 0 | National numbering plan |
| | 1 | 0 | 0 | 1 | Private numbering plan |
| | 1 | 0 | 1 | 0 | ERMES numbering plan (ETSI DE/PS 3 01-3) |
| | 1 | 0 | 1 | 1 | Address-Value encoded according to UCS2 |
| | 1 | 1 | 0 | 1 | Address-Value encoded according to 3GPP TS 23.038 GSM 7-bit National Language tables, using the National Language Identifier(s) conveyed in the IEI fields for Locking Shift Table and/or Single Shift Table in the TP User Data Header |
| | 1 | 1 | 1 | 1 | Reserved for extension |
| All other values are reserved ||||||
| (1) "Service Center specific number" is used to indicate a numbering plan specific to External Short Message Entities attached to the SMSC. ||||||

| Type-of-Number-Extension | | | | |
|---|---|---|---|---|
| Bits | 3 | 2 | 1 | 0 |
| | 0 | 0 | 0 | 0 | Alphanumeric (coded according to 3GPP TS 23.038 GSM 7-bit National Language tables, using the National Language Identifier(s) conveyed in the IEI fields for Locking Shift Table and/or Single Shift Table in the TP User Data Header) |
| | 1 | 1 | 1 | 1 | Reserved for extension |
| | All other values are reserved | | | | |

| Type-of-Number-Extension | | | | |
|---|---|---|---|---|
| Bits | 3 | 2 | 1 | 0 |
| | 0 | 0 | 0 | 0 | Alphanumeric (coded according to 3GPP TS 23.038 GSM 7-bit National Language tables, using the Locking Shift Table and Single Shift Table as conveyed in the National Language Identifiers in the first two octets of the Address Value) |
| | 1 | 1 | 1 | 1 | Reserved for extension |
| | All other values are reserved | | | | |

| Type-of-Number-Extension | | | | |
|---|---|---|---|---|
| Bits | 3 | 2 | 1 | 0 |
| | 0 | 0 | 0 | 0 | Alphanumeric (coded according to UCS2) |
| | 0 | 0 | 0 | 1 | Alphanumeric (coded according to 3GPP TS 23.038 GSM 7-bit National Language tables, using the National Language Identifier(s) conveyed in the IEI fields for Locking Shift Table and/or Single Shift Table in the TP User Data Header) |
| | 1 | 1 | 1 | 1 | Reserved for extension |
| All other values are reserved | | | | |

| Type-of-Number-Extension | | | | |
|---|---|---|---|---|
| Bits | 3 | 2 | 1 | 0 |
| | 0 | 0 | 0 | 0 | Alphanumeric (coded according to UCS2) |
| | 0 | 0 | 0 | 1 | Alphanumeric (coded according to 3GPP TS 23.038 GSM 7-bit National Language tables, using the Locking Shift Table and Single Shift Table as conveyed in the National Language Identifiers in the first two octets of the Address Value) |
| | 1 | 1 | 1 | 1 | Reserved for extension |
| All other values are reserved | | | | |

Figure 8b

| VALUE (hex) | MEANING | Classification | Repeatability |
|---|---|---|---|
| 00 | Concatenated short messages, 8-bit reference number | SMS Control | No |
| 01 | Special SMS Message Indication | SMS Control | Yes |
| 02 | Reserved | N/A | N/A |
| 03 | Value not used to avoid misinterpretation as <LF> character | N/A | N/A |
| 04 | Application port addressing scheme, 8 bit address | SMS Control | No |
| 05 | Application port addressing scheme, 16 bit address | SMS Control | No |
| 06 | SMSC Control Parameters | SMS Control | No |
| 07 | UDH Source Indicator | SMS Control | Yes |
| 08 | Concatenated short message, 16-bit reference number | SMS Control | No |
| 09 | Wireless Control Message Protocol | SMS Control | Note 3 |
| 0A | Text Formatting | EMS Control | Yes |
| 0B | Predefined Sound | EMS Content | Yes |
| 0C | User Defined Sound (iMelody max 128 bytes) | EMS Content | Yes |
| 0D | Predefined Animation | EMS Content | Yes |
| 0E | Large Animation (16*16 times 4 = 32*4 =128 bytes) | EMS Content | Yes |
| 0F | Small Animation (8*8 times 4 = 8*4 =32 bytes) | EMS Content | Yes |
| 10 | Large Picture (32*32 = 128 bytes) | EMS Content | Yes |
| 11 | Small Picture (16*16 = 32 bytes) | EMS Content | Yes |
| 12 | Variable Picture | EMS Content | Yes |
| 13 | User prompt indicator | EMS Control | Yes |
| 14 | Extended Object | EMS Content | Yes |
| 15 | Reused Extended Object | EMS Control | Yes |
| 16 | Compression Control | EMS Control | No |
| 17 | Object Distribution Indicator | EMS Control | Yes |
| 18 | Standard WVG object | EMS Content | Yes |
| 19 | Character Size WVG object | EMS Content | Yes |
| 1A | Extended Object Data Request Command | EMS Control | No |
| 1B-1F | Reserved for future EMS features (see subclause 3.10) | N/A | N/A |
| 20 | RFC 822 E-Mail Header | SMS Control | No |
| 21 | Hyperlink format element | SMS Control | Yes |
| 22 | Reply Address Element | SMS Control | No |
| 23 | Enhanced Voice Mail Information | SMS Control | No |
| 24 | National Language Single Shift | SMS Control | No |
| 25 | National Language Locking Shift | SMS Control | No |
| 26 | Free-format text source ID | SMS Control | No |
| 27 – 6F | Reserved for future use | N/A | N/A |
| 70 – 7F | (U)SIM Toolkit Security Headers | SMS Control | Note 1 |
| 80 – 9F | SME to SME specific use | SMS Control | Note 2 |
| A0 – BF | Reserved for future use | N/A | N/A |
| C0 – DF | SC specific use | SMS Control | Note 2 |
| E0 – FF | Reserved for future use | N/A | N/A |

Note 1: The functionality of these IEIs is defined in 3GPP TSG 31.115 [28], and therefore, the repeatability is not within the scope of this document and will not be determined here.
Note 2: The functionality of these IEIs is used in a proprietary fashion by different SMSC vendors, and therefore, are not within the scope of this technical specification.
Note 3: The functionality of these IEIs is defined by the WAP Forum and therefore the repeatability is not within the scope of this document and will not be determined here.

Figure 9 es
CHARACTER ENABLEMENT IN SHORT MESSAGE SERVICE

BACKGROUND

The Short Message Service (SMS) is a messaging mechanism that can deliver messages of 140 octets/bytes between subscribers, or to/from an application, service, or other component in a network from/to a subscriber. SMS exists currently in GSM (Global System for Mobile communications) and UMTS (Universal Mobile Telephony System) and will likely be part of deployments in Third Generation Partnership Project (3GPP) LTE (Long Term Evolution) systems. The message payload commonly contains plain text, but there are provisions for other types of data, such as pictures, graphics, ring tones, etc. SMS is defined in 3GPP Technical Specification (TS) 23.040, and some elements (particularly the transport) are defined in 3GPP TS 29.002.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2a is a diagram of binary values in the Type-of-Number field and their corresponding number types, according to the prior art.

FIG. 2b is a diagram of binary values in the Numbering-Plan-Identification field and their corresponding numbering plan identifiers, according to the prior art.

FIG. 3 is a diagram of binary values in the Type-of-Number field and their corresponding number types, according to an embodiment of the disclosure.

FIG. 4a is a diagram of the format of the Type-of-Address field within the TP-OA field, according to an embodiment of the disclosure.

FIG. 4b is a diagram of a Type-of-Number-Extension table, according to an embodiment of the disclosure.

FIG. 5 is a diagram of binary values in the Type-of-Number field and their corresponding number types, according to another embodiment of the disclosure.

FIG. 6a is a diagram of binary values in the Numbering-Plan-Identification field and their corresponding numbering plan identifiers, according to an embodiment of the disclosure.

FIG. 6b is a diagram of binary values in the Numbering-Plan-Identification field and their corresponding numbering plan identifiers, according to another embodiment of the disclosure.

FIG. 7a is a diagram of a Type-of-Number-Extension table, according to another embodiment of the disclosure.

FIG. 7b is a diagram of a Type-of-Number-Extension table, according to another embodiment of the disclosure.

FIG. 8a is a diagram of a Type-of-Number-Extension table, according to another embodiment of the disclosure.

FIG. 8b is a diagram of a Type-of-Number-Extension table, according to another embodiment of the disclosure.

FIG. 9 is a diagram of information elements in the TP User Data header, according to an embodiment of the disclosure.

DETAILED DESCRIPTION

Figure 1A:
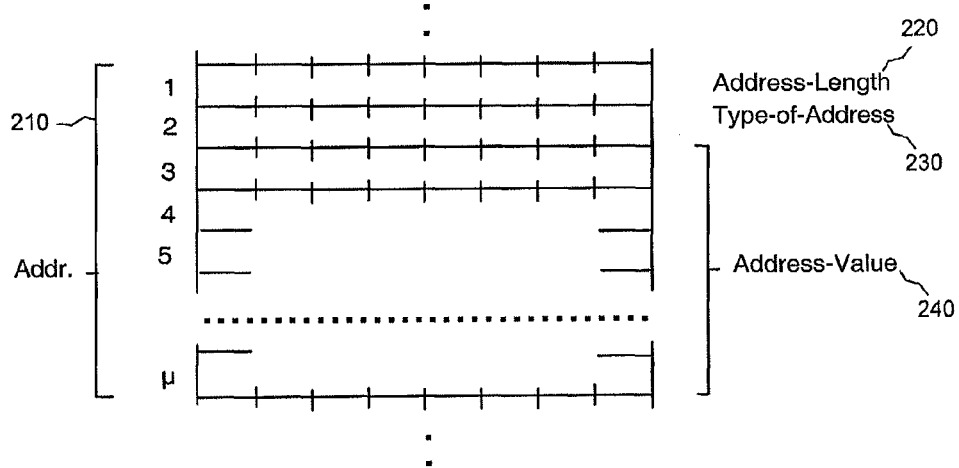
FIG. 1a is a diagram of the structure of the TP-OA field, according to the prior art.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

SMS messages can be sent to or from a mobile device. As used herein, terms such as "mobile device", "mobile station", "MS", "user equipment", "UE", and the like might in some cases refer to transportable devices such as mobile telephones, personal digital assistants, handheld, tablet, nettop, or laptop computers, and similar devices that have telecommunications capabilities. In other cases, such terms might refer to devices that have similar capabilities but that are not transportable, such as desktop computers, set-top boxes, or network appliances. Such terms can also refer to any hardware or software component that can terminate a communication session for a user.

There are several ways of encoding SMS plain text payloads. The original encoding method in SMS used a 7-bit binary encoding of a specific GSM/3GPP "default alphabet" along with an extension table to such an alphabet. This default alphabet and its extension table are defined in 3GPP TS 23.038. The default alphabet with or without its extension table will hereinafter be referred to as the GSM default alphabet.

The size of a single SMS message encoded with the GSM default alphabet is limited to 160 characters, since octets are eight bits in length and the maximum number of octets as previously stated is 140 per SMS message—thus 140*8/7. The GSM default alphabet was defined in the early days of GSM standards specification, when mainly Europe-based operators and manufacturers were involved, and was therefore intended to accommodate only the requirements of European languages. Namely, the Latin alphabet, numbers, and punctuation and a few Greek characters could be accommodated.

To accommodate non-Latin characters, SMS text messages were later allowed to be encoded in the Universal Character Set (UCS2), as defined by the Unicode standard. This is a 16-bit (two octet) encoding of a large character table (2^16=65,536 theoretical maximum of different characters). The use of UCS2 allowed SMS messages to be written in languages containing characters that are not accommodated in the GSM default alphabet. However, a drawback of encoding text in this way is that the number of characters allowed in a single SMS message is limited to just 70 (140*8/16).

A third mechanism for encoding text in SMS messages was then defined, which sought to provide message lengths nearly equivalent to those available with the GSM default alphabet. This third mechanism provides for different language tables to be used from those used in the GSM default alphabet. That is, each character is still encoded using seven bits, but the default alphabet table is replaced with another table that is specific to a particular language. In addition, the extension table used with the GSM default alphabet could also be replaced. The tables used in this third mechanism are referred to as the National Language Single Shift table and the National Language Locking Shift table. Encoding that uses these tables will hereinafter be referred to as National Language table-based encoding. The first language to make use of National Language table-based encoding was Turkish, and since then many other national languages have been added.

With National Language table-based encoding, if either or both of a different default alphabet table and extension table are selected, an octet from the SMS message payload is reserved to convey how many octets are providing additional fields to the actual payload data. After this, three octets are reserved from the message body to select an alternative language table than the default alphabet and another three octets are reserved for selecting a different extension table. So if only a different default alphabet table or a different extension table is selected, the overhead compared to a usual 7-bit encoded message is four octets. If both a different default alphabet table and a different extension table are selected, the overhead compared to a usual 7-bit encoded message is seven octets. This therefore provides 155 characters ((140−4)*8/7) where only a different default alphabet table or a different extension table is selected, and 152 characters ((140−5)*8/7) where both are used. Thus, over 50% more characters are allowed in National Language table-based encoding than in UCS2 encoding.

SMS messages sent from a mobile device are known as Mobile Originated (MO), and SMS messages sent to a mobile device are known as Mobile Terminated (MT). The present disclosure focuses on only the MT case, and the terms "mobile device" and "receiving entity" can therefore be considered interchangeable herein.

There are two types of MT messages: Mobile Originated and Application Originated. A Mobile Originated MT SMS message is a message that was originally sourced from another mobile device or, more generally, another mobile operator subscriber. An Application Originated MT SMS message is a message that was originally sourced from an entity in the network. Application Originated MT SMS messages can include messages from a subscribed service, such as the latest sports results, or messages from a non-subscribed service, such as an advertisement message or a confirmation of a "text vote".

In an Application Originated MT SMS message, the address of the source from which the message originated is commonly set to be a free-form text string and is encoded in a field known as the TP-Originating-Address (TP-OA) field. This free-form text string does not represent any routable address, and is simply a "human-friendly-only" piece of text. Therefore, SMS messages using this as their source address cannot be replied to. Consequently, any SMS message that uses this as the destination address cannot be delivered and is generally not accepted from a sending entity by a receiving entity.

The TP-OA field, like any other address field in an SMS message, consists of an Address-Length field of one octet, a Type-of-Address field of one octet (which in turn consists of a Type-of-Number field of three bits and Numbering-Plan-Identification field of four bits), and one Address-Value field of variable length as defined in clause 9.1.2.5 of 3GPP TS 23.040.

Figure 1B:
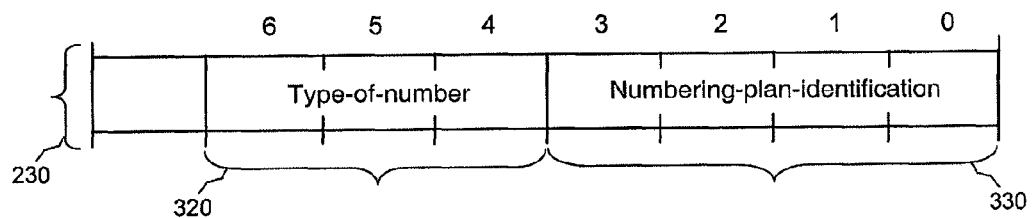
FIG. 1b is a diagram of the format of the Type-of-Address field within the TP-OA field, according to the prior art.

FIG. 1a illustrates the structure of the TP-OA field 210 in the prior art. The TP-OA field 210 includes an Address-Length field 220, a Type-of-Address field 230, and an Address-Value field 240. FIG. 1b illustrates the format of the Type-of-Address field 230 within the TP-OA field 210 in the prior art. The Type-of-Address field 230 includes a 3-bit Type-of-Number field 320 and a 4-bit Numbering-Plan-Identification field 330.

FIG. 2a illustrates the possible binary values that could be placed in the Type-of-Number field 320 and their corresponding number types. FIG. 2b illustrates the possible binary values that could be placed in the Numbering-Plan-Identification field 330 and their corresponding numbering plan identifiers.

The following description of the TP-OA field 210 is adapted from 3GPP TS 23.040 and is provided for the convenience of the reader: The TP-OA field consists of the following sub-fields: an Address-Length field of one octet, a Type-of-Address field of one octet, and one Address-Value field of variable length. The Address-Length field is an integer representation of the number of useful semi-octets within the Address-Value field, i.e., it excludes any semi-octet containing only fill bits. The MS shall interpret reserved values as "Unknown" but shall store them exactly as received. The SC may reject messages with a type of number containing a reserved value or one which is not supported. Reserved values shall not be transmitted by an SC conforming to this version of the specification. For Type-of-Number=101, bits 3,2,1,0 are reserved and shall be transmitted as 0000. Note that for addressing any of the entities SC, MSC, SGSN or MS, Numbering-Plan-Identification=0001 shall always be used. However, for addressing the SME, any specified Numbering-Plan-Identification value may be used. Within the Address-Value field, either a semi-octet or an alphanumeric representation applies. (This applies only to addressing at the SM-TL.) The maximum length of the full address field (Address-Length, Type-of-Address and Address-Value) is 12 octets.

It should be noted that any addressing type fields that use the structure described above can benefit from the embodiments described herein with respect to the TP-OA. Hereinafter, any such field will be referred to as the TP-OA field, but it should be understood that the descriptions could apply to other types of source address fields or other types of address fields in general. Also, it should be understood that the term "source address" as used herein can refer to any identifier or other text associated with a sending entity and is not limited to routable or non-routable addresses.

As stated above, for Type of Number=101 ("Alphanumeric"), the bits 3,2,1,0 are reserved and are transmitted as 0000. Thus, when a free-form text string is sent as the source address of a message, the TP-OA consists of a Type of Number setting of 101 and a Numbering Plan Identification of 0000. This allows a string of text to be shown as the sender of an SMS message. For example, the name of a television show could appear as the SMS message source address if the show uses SMS voting and sends a "thank you for your vote" type of message. As another example, the name of a service, such as a service that sends texts with sports results, could appear as the SMS message source address.

The free-form text used in the TP-OA field is currently limited to only the characters available in the GSM default alphabet as defined in 3GPP TS 23.038. Characters not in that coding scheme cannot currently be used in the TP-OA field. This is unlike the SMS message payload, as encoded in the TP User Data field, where UCS2 encoding and National Language table-based encoding are currently allowed. The use of a free-form source address is therefore limited to only those languages that use characters that are represented in the limited character set of the GSM default alphabet.

In various embodiments, a sending entity can convey a free-form text source address in either a new field or in the existing TP-OA field using a different encoding than the GSM default alphabet. When the free-form text source address is sent in a new field, the encoding used (e.g., GSM default alphabet, UCS2, or National Language table-based) may be implied or indicated explicitly. When the free-form text source address is sent in the existing TP-OA field, the encoding used is explicitly indicated, as the free-form text source address in the TP-OA field is already implied to use the GSM default alphabet. The embodiments are backwards compatible with current and previous deployments of SMS and associated equipment.

Embodiments of seven implementations are described herein for allowing alternative character encodings of the free-form text source address in order to allow for languages other than those that can be represented in the current GSM default alphabet. Some of the implementations may stand alone, and some may be used in various combinations with other implementations. The first three implementations described below reuse the existing TP-OA field. The last four implementations described below alternatively or additionally use a field in the SMS message body.

In implementation #1, the TP-OA field uses only UCS2 encoding. In implementation #2, the TP-OA field uses only National Language table-based encoding. In implementation #3, the TP-OA field can use either UCS2 encoding or National Language table-based encoding. A mechanism is provided in implementation #3 for selecting the type of encoding to be used.

In implementation #4, a new field is added within an SMS message to give a free-form source address, in addition to whatever is conveyed in the TP-OA field. This new field can be encoded using the GSM default alphabet, UCS2, or National Language table-based encoding. In implementation #5, a reserved string is defined to appear within an SMS message payload. This string may, but need not, be presented to the end user as part of the message. For example, the string could be presented in the usual SMS message header information. In implementation #6, an appropriate field, such as "FROM", is reused in an inserted RFC 822 email header in an SMS message payload. In implementation #7, an appropriate field, such as "FN" or "ORG", is reused in an inserted vCard in an SMS message payload. The insertion of such an email header or such a vCard is specified in 3GPP TS 23.040.

A generic description of a procedure that could apply to any of the seven implementations for a sending entity is as follows: (1) Choose an encoding scheme that allows efficient or appropriate encoding of the characters in the free-form text associated with the source address. (2) If applicable, insert an indication for the chosen encoding scheme, as described in the detailed implementations below. (3) Insert the free-form text in either the TP-OA's Address-Value field or another information element or in a field in the SMS message, as described in the detailed implementations below. (4) If the TP-OA's Address-Value field is not used to convey the free-form text source address, then the sending entity may include an additional, valid address in the TP-OA, such as an E.164 telephone number or a short code. (5) Perform any other existing functions, and then send the SMS message to the receiving entity.

A generic description that could apply to any of the seven implementations for a receiving entity is as follows: (1) Determine the chosen encoding scheme of the free-form text source address, either by analyzing the received indication or by applying pre-existing "knowledge" of the encoding scheme used by the field in which the free-form text is conveyed. For example, the field might be standardized to only ever use one particular scheme. (2) Decode the free-form text source address to the characters represented and display the characters on the mobile device. (3) If the TP-OA's Address-Value field was not used to convey the free-form text source address and the sending entity included a valid source address in that field, such as an E.164 telephone number or a short code, the receiving entity may then display that address on the mobile device in addition or alternatively to the free-form text source address.

It should be noted that both the sending and receiving entities may need enhancements or upgrades to support the capability of using an encoding scheme for the free-form text source address that is different from the current default encoding scheme. However, since the sending entity is typically not aware of the capabilities of the receiving entity, the encoding may need to be done in such a way as to be backwards compatible with existing receiving entities. That is, the encoding should not inadvertently cause undesirable behavior in the receiving entity, such as crashing or an inability to display the SMS message, and should not cause failure of delivery of the SMS message. The generic descriptions provided above apply to sending and receiving entities that have been enhanced to be capable of recognizing encoding schemes other than the default. The impact on a receiving entity that has not been enhanced in this manner is dependent on the method used for the conveying the free-form text source address. The detailed descriptions provided below contain more information regarding backwards compatibility for a receiving entity that has not been enhanced.

In 3GPP/GSM/UMTS/LTE networks, the encoding of the TP-OA field in theory has no effect on its delivery, either to the service center (SC) in the MO case or to the mobile device in the MT case. This is because the routing and transferring of the message is performed based on the destination address in the TP-Destination Address (TP-DA) field. In addition, the SMS message is "wrapped" in other protocols, such as NAS signaling or MAP signaling, in order to transport the message across the different parts of the different networks from the sending entity to the receiving entity. Thus, even if the receiving entity is a mobile device that is "roaming" (that is, the device is attached to a network not belonging to its home operator) this has no effect on the transfer of the SMS message, since the source address of the transport protocol is independent of the source address of the SMS message in the TP-OA field.

Details regarding each of the seven implementations will now be provided. In implementation #1, the TP-OA field uses UCS2 encoding of characters instead of the GSM default alphabet. In various embodiments, at least three concepts are provided under implementation #1.

Under the first concept for implementation #1, a flag, code point, or identifier is used in the Type-of-Number (ToN) field within the source address field to indicate the coding scheme used. More specifically, the currently unused value of binary 111 in the ToN field is used to indicate that the TP-OA field is alphanumeric but encoded using UCS2 rather than the GSM default alphabet.

To implement this concept, the following change can be made to TS 23.040, section 9.1.2.5: As illustrated in FIG. 3, in the Type-of-Number field 420, the type of number that is associated with the binary value 111 can be changed from "Reserved for extension", as shown at item 340 in the prior art table of FIG. 2a, to "Alphanumeric, (coded according to UCS2)", or equivalent wording, as shown at item 440 in FIG. 3.

Backwards compatibility is retained under this concept because a mobile device that has not been enhanced for this concept and that receives an SMS message with this concept utilized will ignore the rest of the TP-OA field (i.e. the following 4 bits representing the Numbering-Plan-Identification field and the following byte(s) representing the Address-Value field, or at least, treat the address in the Address-Value field in the TP-OA field as an unknown type of address) but store the entire TP-OA field as is (as defined in 3GPP TS 23.040, clause 9.1.2.5) and continue processing from the next field after the TP-OA field. This also means that if such a mobile device is later upgraded or enhanced to support this concept, then the source address will be available and thus displayable to the end user.

Under the second concept for implementation #1, a flag, code point, or identifier is used in the ToN field within the source address field to indicate that another flag, code point, or identifier indicates the coding scheme used. That is, a new sub-table of ToN values is added and is linked from the existing ToN value of 111. A value in the sub-table can indicate the type of encoding being used for the source address. More specifically, the currently unused value of binary 111 in the ToN field is used to indicate that encoding other than GSM default alphabet-based encoding is being used in the TP-OA and that the specific type of encoding being used can be found in a second field in another table. For this concept under this implementation, the second field in the other table indicates that UCS2 encoding is being used for the TP-OA. This second field will hereinafter be referred to as the "Type of Number Extension" (ToNE). This redirection allows for future extensibility.

In an embodiment, the ToNE replaces the existing 4-bit Numbering-Plan-Identification (NPI) field. That is, the ToNE takes over the same four bits in the same octet as the NPI field. Alternatively, the ToNE could be a new field, in which case the ToNE can be encoded in a different number of bits. In the latter case, the ToNE field could be another octet following the ToN and NPI fields, or else could be a new Information Element (IE) in the SMS message body. Regardless of how the ToNE field is conveyed, the ToNE field contains at least an entry to indicate that the UCS2 coding scheme is being used for the TP-OA.

FIG. 4a illustrates changes that might be made to 3GPP TS 23.040, section 9.1.2.5 when the ToNE field replaces the NPI field. It can be seen that the format for the Type-of-Address field 230 for ToN values 000-110 is the same as in the prior art. That is, the Type-of-Address field 230 for ToN values 000-110 includes a 3-bit Type-of-Number field 320 and a 4-bit Numbering-Plan-Identification field 330. However, the Type-of-Address field 510 is modified for ToN value 111 in that the Numbering-Plan-Identification field 330 is replaced by a Type-of-Number-Extension field 520.

In addition, in the Type-of-Number field 320, as illustrated in FIG. 2a, the type of number that is associated with the binary value 111 can be changed from "Reserved for extension", as shown at item 340, to "Extended value used (refer to the Type-of-Number-Extension Table)" or equivalent wording. That is, item 440 in FIG. 3 might contain "Extended value used (refer to the Type-of-Number-Extension Table)" or equivalent wording.

FIG. 4b illustrates an example of a Type-of-Number-Extension table 520 that may be implemented under this concept. It can be seen that, when the Type-of-Number-Extension field 520 has the value 0000, the type of number is alphanumeric and is coded according to UCS2. A Type-of-Number-Extension field 520 with the value 1111 indicates that the field is reserved for extension. In other embodiments, other binary values could be used to provide this information.

Backwards compatibility is retained under this concept because a mobile device that has not been enhanced for this concept and that receives an SMS message with this concept utilized will ignore the rest of the TP-OA field (i.e. the following 4 bits representing the ToNE or Numbering-Plan-Identification field and the following byte(s) representing the Address-Value field, or at least, treat the address in the Address-Value field in the TP-OA field as an unknown type of address) and ignore any new IE but will store the entire TP-OA and any new IE as is (as defined in 3GPP TS 23.040, clause 9.1.2.5 and clause 9.2.3.24, respectively) and continue processing from the next field after the TP-OA or new IE (representing the ToNE field), as appropriate. This also means that if such a mobile device is later upgraded or enhanced to support this concept, then the source address will be available and thus displayable to the end user.

Under the third concept for implementation #1, a new NPI value is added. That is, a flag, code point, or identifier is used in the NPI within the source address field to indicate the coding scheme used. More specifically, the existing value of 101 in the ToN field is used to indicate that the TP-OA is alphanumeric, as in the prior art. However, under this concept, rather than the encoding using the GSM default alphabet, as in the prior art and as illustrated at item 350 in FIG. 2a, the encoding follows a value in an NPI field, which in this case represents UCS2. This is illustrated at item 610 in FIG. 5, where "Alphanumeric (coded according to NPI value)" is associated with binary value 101.

The NPI field retains the status quo of 0000 indicating the GSM default alphabet in order to retain compatibility with existing deployments. Any other value of the NPI can be used to indicate that UCS2 encoding is used for the TP-OA, since the NPI has not previously been taken into account when the ToN is set to 101/Alphanumeric. Thus, existing values are only relevant for when the ToN is of a numeric type (i.e., values 001-100 and 110). Therefore, either an unused value from the existing list of NPI values can be used, or else a new list of NPI values can be created for when the ToN is set to 101/Alphanumeric.

To implement this concept, the following changes can be made to TS 23.040, section 9.1.2.5: In the Type-of-Number field 320, as illustrated in FIG. 2a, the type of number that is associated with the binary value 101 can be changed from "Alphanumeric, (coded according to TS 23.038 GSM 7 bit default alphabet)", as shown at item 350, to "Alphanumeric, (coded according to NPI value)", or equivalent wording, as shown at item 610 in FIG. 5.

In the Numbering Plan Identification field 330, as illustrated in FIG. 2b, the numbering plan identification that is associated with the binary value 0000 can be changed from "Unknown", as shown at item 360, to "Unknown/Address-Value encoded according to 3GPP TS 23.038 GSM 7-bit default alphabet", or equivalent wording, as shown in FIG. 6a at item 710. In addition, a new binary value can be added to the Numbering Plan Identification field 330 of FIG. 2b and can indicate "Address-Value encoded according to UCS2", or similar wording. In an embodiment, the new binary value might be 1011. This is illustrated in FIG. 6b, where item 720 has been added to the Numbering-Plan-Identification field 730 and has "Address-Value encoded according to UCS2" associated with binary value 1011.

These changes might be described in 3GPP TS 23.040 by the following wording or the equivalent: "For Type of number=101, bits 3,2,1,0 shall be set to 0000 for 3GPP TS 23.038 GSM 7-bit default alphabet, and 1011 for UCS2. Note that for addressing any of the entities SC, MSC, SGSN or MS, Numbering plan identification=0001 shall always be used. However, for addressing the SME, any specified Numbering plan identification value may be used".

In implementation #2, characters in the TP-OA field are encoded using National Language table-based encoding instead of the GSM default alphabet. In various embodiments, at least three concepts are provided under implementation #2 to permit the TP-OA field to use National Language table-based encoding instead of the GSM default alphabet.

Under the first concept for implementation #2, the currently reserved ToN value of 111 is reused. That is, a flag, code point, or identifier is used in the ToN field within the source address field to indicate the coding scheme used. More specifically, the currently unused value of binary 111 in the ToN field to indicate that the TP-OA field is alphanumeric but encoded using National Language table-based encoding as opposed to the GSM default alphabet.

In an embodiment, the National Language Identifiers conveyed in the information element identifier (IEI) fields for the Locking Shift Table and/or the Single Shift Table in the TP User Data Header are reused and made applicable for the TP-OA field. Currently, they are applicable for the SMS message body only. Alternatively, a new National Language Identifier field for the language used in the TP-OA field can be used. For efficient encoding, the first two octets of the TP-OA field can contain the National Language Identifier code (in the range of 0-255) for indicating the Locking Shift Table and the Single Shift Table, respectively. To indicate the default alphabet table or default extension table to be used, a value of zero is inserted in the Locking Shift Table and/or Single Shift Table, respectively.

To implement this concept, the following changes can be made to 3GPP TS 23.040, section 9.1.2.5, assuming that National Language Identifiers in associated IEI fields from the TP-User-Header are reused: In the Type-of-Number field 320, as illustrated in FIG. 2*a*, the type of number that is associated with the binary value 111 can be changed from "Reserved for extension", as shown at item 340, to "Alphanumeric, (coded according to 3GPP TS 23.038 GSM 7-bit National Language tables, using the National Language Identifier(s) conveyed in the IEI fields for Locking Shift Table and/or Single Shift Table in the TP User Data Header)", or equivalent wording. That is, item 440 in FIG. 3 might contain "Alphanumeric, (coded according to 3GPP TS 23.038 GSM 7-bit National Language tables, using the National Language Identifier(s) conveyed in the IEI fields for Locking Shift Table and/or Single Shift Table in the TP User Data Header)" or equivalent wording.

If it is assumed that National Language Identifiers are in the first two octets of the Address-Value field, the following changes can be made to TS 23.040, section 9.1.2.5: In the Type-of-Number field 320, as illustrated in FIG. 2*a*, the type of number that is associated with the binary value 111 can be changed from "Reserved for extension", as shown at item 340, to "Alphanumeric, (coded according to 3GPP TS 23.038 GSM 7-bit National Language tables, using the Locking Shift Table and Single Shift Table as conveyed in the National Language Identifiers in the first two octets of the Address-Value)", or equivalent wording. That is, item 440 in FIG. 3 might contain "Alphanumeric, (coded according to 3GPP TS 23.038 GSM 7-bit National Language tables, using the Locking Shift Table and Single Shift Table as conveyed in the National Language Identifiers in the first two octets of the Address-Value)" or equivalent wording.

Backwards compatibility is retained because a mobile device that has not been enhanced for this concept and that receives an SMS message with this concept utilized will ignore the rest of the TP-OA field (i.e. the following 4 bits representing the Numbering-Plan-Identification field and the following byte(s) representing the Address-Value field, or at least, treat the address in the Address-Value field in the TP-OA field as an unknown type of address) but store the entire TP-OA field as is (as defined in 3GPP TS 23.040, clause 9.1.2.5) and continue processing from the next field after the TP-OA field. This also means that if such a mobile device is later upgraded or enhanced to support this concept, then the source address will be available and thus displayable to the end user.

Under the second concept for implementation #2, a flag, code point, or identifier is used in the ToN field within the source address field to indicate that another flag, code point, or identifier indicates the coding scheme used. That is, a new sub-table of ToN values is added and is linked from the existing ToN value of 111. A value in the sub-table can indicate the type of encoding being used for the source address.

More specifically, the currently unused value of binary 111 in the ToN field is used to indicate that encoding other than GSM default alphabet-based encoding is being used in the TP-OA and that the specific type of encoding being used can be found in a second field in another table. For this concept under this implementation, the second field in the other table indicates that National Language table-based encoding is being used for the TP-OA. As with the second concept under implementation #1, this second field can be referred to as the ToNE. This redirection allows for future extensibility.

In an embodiment, the ToNE replaces the existing 4-bit NPI field. That is, the ToNE takes over the same four bits in the same octet as the NPI field. Alternatively, the ToNE could be a new field, in which case the ToNE can be encoded in a different number of bits. In the latter case, the ToNE field could be another octet following the ToN and NPI fields, or else could be a new IE in the SMS message body. Regardless of how the ToNE field is conveyed, the ToNE field contains at least an entry to indicate that the coding scheme being used for the TP-OA is National Language table-based encoding.

In an embodiment, the National Language Identifiers conveyed in the IE fields for the Locking Shift Table and/or the Single Shift Table in the TP User Data Header are reused and made applicable for the TP-OA field. Currently, they are applicable for the SMS message body only. Alternatively, a new National Language Identifier field for the language used in the TP-OA field can be used. For efficient encoding, the first two octets of the TP-OA field can contain the National Language Identifier code (in the range of 0-255) for indicating the Locking Shift Table and Single Shift Table, respectively. To indicate the default alphabet table or default extension table to be used, a value of zero is inserted in the Locking Shift Table and/or Single Shift Table, respectively.

To implement this concept, the following changes can be made to 3GPP TS 23.040, section 9.1.2.5: In the Type-of-Number field 320, as illustrated in FIG. 2*a*, the type of number that is associated with the binary value 111 can be changed from "Reserved for extension", as shown at item 340, to "Extended value used (refer to the Type-of-Number-Extension Table)", or equivalent wording. That is, item 440 in FIG. 3 might contain "Extended value used (refer to the Type-of-Number-Extension Table)" or equivalent wording. In addition, the format of the Type-of-Address field 510 can be modified as illustrated in FIG. 4*a*.

FIG. 7*a* illustrates an example of a Type-of-Number-Extension table 810 that may be implemented if it is assumed that National Language Identifiers in associated IEI fields from the TP-User-Header are reused (with the ToNE field coded to replace the NPI field). FIG. 7b illustrates an example of a Type-of-Number-Extension table 820 that may be implemented if it is assumed that a National Language Identifier in the first two octets of the Address-Value field is used. In both cases, a Type-of-Number-Extension value of 0000 indicates that National Language table-based encoding is being used, and a Type-of-Number-Extension value of 1111 indicates that the field is reserved for extension. In other embodiments, other binary values could be used to provide this information.

Backwards compatibility is retained because a mobile device that has not been enhanced for this concept and that receives an SMS message with this concept utilized will ignore the rest of the TP-OA field (i.e. the following 4 bits representing the ToNE or Numbering-Plan-Identification field and the following byte(s) representing the Address-Value field, or at least, treat the address in the Address-Value field in the TP-OA field as an unknown type of address) and ignore any new IE but will store the entire TP-OA and any new IE as is (as defined in 3GPP TS 23.040, clause 9.1.2.5 and clause 9.2.3.24, respectively) and continue processing from the next field after the TP-OA or new IE (representing the ToNE field), as appropriate. This also means that if such a mobile device is later upgraded or enhanced to support this concept, then the source address will be available and thus displayable to the end user. Reusing National Language Identifiers conveyed in the IE fields for the Locking Shift Table and/or the Single Shift Table in the TP User Data Header is arguably more robust (from a backwards compatibility point of view) in the case where a receiving entity attempts to decode the Address-Value field of the TP-OA using the GSM default alphabet.

Under the third concept for implementation #2, a new NPI value is added. That is, a flag, code point, or identifier is used in the NPI within the source address field to indicate the coding scheme used. More specifically, the existing value of 101 in the ToN field is used to indicate that the TP-OA is alphanumeric, as in the prior art. However, under this concept, rather than the encoding using the GSM default alphabet, as in the prior art and as illustrated at item 350 in FIG. 2a, the encoding follows a value in the NPI field, which in this case represents National Language table-based encoding. This is illustrated at item 610 in FIG. 5, where "Alphanumeric (coded according to NPI value)" is associated with binary value 101.

The NPI field retains the status quo of 0000 indicating the GSM default alphabet in order to retain compatibility with existing deployments. Any other value of the NPI can be used to indicate that National Language table-based encoding is used for the TP-OA, since the NPI has not previously been taken into account when the ToN is set to 101/Alphanumeric. Thus, existing values are only relevant for when the ToN is of a numeric type (i.e., values 001-100 and 110). Therefore, either an unused value from the existing list of NPI values can be used, or else a new list of NPI values can be created for when the ToN is set to 101/Alphanumeric.

To implement this concept, the following changes can be made to 3GPP TS 23.040, section 9.1.2.5: In the Type-of-Number field 320, as illustrated in FIG. 2a, the type of number that is associated with the binary value 101 can be changed from "Alphanumeric, (coded according to TS 23.038 GSM 7 bit default alphabet)", as shown at item 350, to "Alphanumeric, (coded according to NPI value)", or equivalent wording, as shown at item 610 in FIG. 5.

In the Numbering Plan Identification field 330, as illustrated in FIG. 2b, the numbering plan identification that is associated with the binary value 0000 can be changed from "Unknown", as shown at item 360, to "Unknown/Address-Value encoded according to 3GPP TS 23.038 GSM 7-bit default alphabet", or equivalent wording, as shown at item 710 in FIG. 6a. In addition, a new binary value can be added to the Numbering Plan Identification field 330 of FIG. 2b and can indicate "Address-Value encoded according to 3GPP TS 23.038 GSM 7-bit National Language tables, using the National Language Identifier(s) conveyed in the IEI fields for Locking Shift Table and/or Single Shift Table in the TP User Data Header", or similar wording. In an embodiment, the new binary value might be 1011. That is, at item 720 in FIG. 6a, "Address-Value encoded according to 3GPP TS 23.038 GSM 7-bit National Language tables, using the National Language Identifier(s) conveyed in the IEI fields for Locking Shift Table and/or Single Shift Table in the TP User Data Header" might be associated with binary value 1011.

These changes might be described in 3GPP TS 23.040 by the following wording or the equivalent: "For Type of number=101, bits 3,2,1,0 shall be set to 0000 for 3GPP TS 23.038 GSM 7-bit default alphabet, and 1011 for GSM 7-bit National Language tables, using the National Language Identifier(s) conveyed in the IEI fields for Locking Shift Table and/or Single Shift Table in the TP User Data Header). Note that for addressing any of the entities SC, MSC, SGSN or MS, Numbering plan identification=0001 shall always be used. However, for addressing the SME, any specified Numbering plan identification value may be used".

In implementation #3, either UCS2 encoding or National Language table-based encoding is used to encode characters in the TP-OA field. Selection functionality is provided for specifying which type of encoding is used in the TP-OA field. In various embodiments, at least two concepts are provided under implementation #3 in order to permit the TP-OA field to use either UCS2 encoding or National Language table-based encoding.

Under the first concept for implementation #3, a new sub-table of ToN values, linked from the existing ToN value of 111, is added. That is, a flag, code point, or identifier is used in the ToN within the source address field to indicate that another flag, code point, or identifier is used to indicate the coding scheme used.

More specifically, the currently unused value of binary 111 in the ToN field is used to indicate that encoding other than GSM default alphabet-based encoding is being used in the TP-OA and that the specific type of encoding being used can be found in a second field in another table. For this concept under this implementation, the second field can contain a first value to indicate that UCS2 is being used and can contain a second value to indicate that National Language table-based encoding is being used. As with the second concept under implementation #1 and the second concept under implementation #2, the second field can be referred to as the ToNE. This redirection allows for future extensibility.

In an embodiment, the ToNE replaces the existing 4-bit NPI field. That is, the ToNE takes over the same four bits in the same octet as the NPI field. Alternatively, the ToNE could be a new field, in which case the ToNE can be encoded in a different number of bits. In the latter case, the ToNE field could be another octet following the ToN and NPI fields, or else could be a new IEI field in the SMS message body. Regardless of how the ToNE field is conveyed, the ToNE field contains at least entries for UCS2 and National Language table-based encoding. The order of the two is irrelevant, as are the code points that are used.

In an embodiment, the National Language Identifiers conveyed in the IE fields for the Locking Shift Table and/or the Single Shift Table in the TP User Data Header are reused and made applicable for the TP-OA field. Currently, they are applicable for the SMS message body only. Alternatively, a new National Language Identifier field for the language used in the TP-OA field can be used. For efficient encoding, the first two octets of the TP-OA field can contain the National Language Identifier code (in the range of 0-255) for indicating the Locking Shift Table and Single Shift Table, respectively. To indicate the default alphabet table or default extension table to be used, a value of zero is inserted in the Locking Shift Table and/or Single Shift Table, respectively.

To implement this concept, the following changes can be made to 3GPP TS 23.040, section 9.1.2.5: In the Type-of-Number field 320, as illustrated in FIG. 2a, the type of number that is associated with the binary value 111 can be changed from "Reserved for extension", as shown at item 340, to "Extended value used (refer to the Type-of-Number-Extension Table)", or equivalent wording. That is, item 440 in FIG. 3 might contain "Extended value used (refer to the Type-of-Number-Extension Table)" or equivalent wording. In addition, the format of the Type-of-Address field 510 can be modified as illustrated in FIG. 4a.

FIG. 8a illustrates an example of a Type-of-Number-Extension table 910 that may be implemented if it is assumed that National Language Identifiers in associated IEI fields from the TP-User-Header are reused (with the ToNE field coded to replace the NPI field). FIG. 8b illustrates an example of a Type-of-Number-Extension table 920 that may be implemented if it is assumed that a National Language Identifier in the first two octets of the Address-Value field is used. In both cases, a Type-of-Number-Extension value of 0000 indicates that UCS2 is being used, a Type-of-Number-Extension value of 0001 indicates that National Language table-based encoding is being used, and a Type-of-Number-Extension value of 1111 indicates that the field is reserved for extension. In other embodiments, other binary values could be used to provide this information.

Backwards compatibility is retained because a mobile device that has not been enhanced for this concept and that receives an SMS message with this concept utilized will ignore the rest of the TP-OA field (i.e. the following 4 bits representing the ToNE or Numbering-Plan-Identification field and the following byte(s) representing the Address-Value field, or at least, treat the address in the Address-Value field in the TP-OA field as an unknown type of address) and ignore any new IE but will store the entire TP-OA and any new IE as is (as defined in 3GPP TS 23.040, clause 9.1.2.5 and clause 9.2.3.24, respectively) and continue processing from the next field after the TP-OA or new IE (representing the ToNE field), as appropriate. This also means that if such a mobile device is later upgraded or enhanced to support this concept, then the source address will be available and thus displayable to the end user. Reusing the National Language Identifiers conveyed in the IE fields for the Locking Shift Table and/or the Single Shift Table in the TP User Data Header is arguably more robust (from a backwards compatibility point of view) in the case where a receiving entity attempts to decode the Address-Value field of the TP-OA using the GSM default alphabet.

Under the second concept for implementation #3, new NPI values are added. That is, a flag, code point, or identifier is used in the NPI within the source address field to indicate the coding scheme used. More specifically, the existing value of 101 in the ToN field is used to indicate that the TP-OA is alphanumeric as in the prior art. However, under this concept, rather than the encoding using the GSM default alphabet, as in the prior art and as illustrated at item 350 in FIG. 2a, the encoding follows a value in the NPI field. This is illustrated at item 610 in FIG. 5, where "Alphanumeric (coded according to NPI value)" is associated with binary value 101. In this case, the value in the NPI field can represent either UCS2 or National Language table-based encoding.

The NPI field retains the status quo of 0000 indicating the GSM default alphabet in order to retain compatibility with existing deployments. Any other values of the NPI can be used to indicate that either UCS2 or National Language table-based encoding is used for the TP-OA, since the NPI has not previously been taken into account when the ToN is set to 101/Alphanumeric. Thus, existing values are only relevant for when the ToN is of a numeric type (i.e., values 001-100 and 110). Therefore, either an unused value from the existing list of NPI values can be used, or else a new list of NPI values can be created for when the ToN is set to 101/Alphanumeric.

To implement this concept, the following changes can be made to 3GPP TS 23.040, section 9.1.2.5: In the Type-of-Number field 320, as illustrated in FIG. 2a, the type of number that is associated with the binary value 101 can be changed from "Alphanumeric, (coded according to TS 23.038 GSM 7 bit default alphabet)", as shown at item 350, to "Alphanumeric, (coded according to NPI value)", or equivalent wording, as shown at item 610 in FIG. 5.

In the Numbering Plan Identification field 330, as illustrated in FIG. 2b, the numbering plan identification that is associated with the binary value 0000 can be changed from "Unknown", as shown at item 360, to "Unknown/Address-Value encoded according to 3GPP TS 23.038 GSM 7-bit default alphabet", or equivalent wording, as shown at item 710 in FIG. 6b. In addition, two new binary values can be added to the Numbering Plan Identification field 330 of FIG. 2b. One of the new binary values can indicate "Address-Value encoded according to UCS2", or similar wording. In an embodiment, this binary value might be 1011. This is illustrated at item 720 in FIG. 6b. The other new binary value can indicate "Address-Value encoded according to 3GPP TS 23.038 GSM 7-bit National Language tables, using the National Language Identifier(s) conveyed in the IEI fields for Locking Shift Table and/or Single Shift Table in the TP User Data Header", or similar wording. In an embodiment, this binary value might be 1101. This is illustrated at item 740 in FIG. 6b.

These changes might be described in 3GPP TS 23.040 by the following wording or the equivalent: "For Type of number=101, bits 3,2,1,0 shall be set to 0000 for 3GPP TS 23.038 GSM 7-bit default alphabet. Bits 3,2,1,0 shall be set to 1011 for UCS2. Bits 3,2,1,0 shall be set to 1101 for GSM 7-bit National Language tables, using the National Language Identifier(s) conveyed in the IEI fields for Locking Shift Table and/or Single Shift Table in the TP User Data Header. Note that for addressing any of the entities SC, MSC, SGSN or MS, Numbering plan identification=0001 shall always be used. However, for addressing the SME, any specified Numbering plan identification value may be used".

Summarizing implementations #1, #2, and #3, in implementation #1, the TP-OA field uses only UCS2 encoding, in implementation #2, the TP-OA field uses only National Language table-based encoding, and in implementation #3, the TP-OA field can use either UCS2 encoding or National Language table-based encoding. In implementations #4, #5, #6, and #7, instead of or in addition to the TP-OA field being modified, new fields are added to an SMS message body.

In implementation #4, a new IE can be added in an SMS message in order to permit a free-form text field to be conveyed as the source address. The new IE can be included in the SMS message in addition to or as an alternative to the value that is conveyed in the TP-OA field. That is, in this implementation, an additional IE within the TP User Data Header (TP-UDH) field is defined. Section 9.2.3.24 of 3GPP TS 23.040 specifies that the TP-User Data can include user data only (i.e., 7-bit (default alphabet) data, 8-bit data, or 16-bit (UCS2) data) or can include the header plus optionally the aforementioned user data. That is, the header uses a number of the first 140 octets of the TP-User Data. As defined in Section 9.2.3.23 of 3GPP TS 23.040, the setting and clearing of the TP-User-Data-Header-Indicator (TP-UDHI) bit conveys whether or not the TP-User Data contains any header field.

According to 3GPP TS 23.040, section 9.2.3.24, the header field comprises one or more IEs, which in turn comprise an Information-Element-Identifier of one octet, a Length of Information-Element of one octet and Information-Element Data of the number of octets as specified in the Length of Information-Element field. Since the first two fields are of a known length and known format, a receiving entity can identify whether or not the receiving entity will recognize the data (by analysis of the Information-Element-Identifier) and be able to silently discard the Information-Element Data (by analyzing the Length of Information-Element field and skipping that number of octets after the Length of Information-Element octet) and move on to parsing what comes next, namely another IE or the user data. 3GPP TS 23.040, section 9.2.3.24 also mandates that the receiving entity store the entirety of the TP-User Data, regardless of whether the receiving entity understands or discards any or all of the IEs in the header field. This therefore allows a receiving entity to be later upgraded to understand any previously unrecognized header field IEs, and allows those header field IEs to then be processed when the user selects to view the message.

In an embodiment of implementation #4, a new Information Element within the TP-User Data Header field is defined in order to provide a free-form source address, using the aforementioned mechanism in order to maintain backwards compatibility. This can include reserving an associated value/code point in the list of allocated values/code points of the Information-Element-Identifier field and following the convention described above in order to provide full backwards compatibility to receiving entities.

The Information-Element Data can be a fixed number of octets in length or can be variable. The latter may be a preferred method as that method allows for free-form source address text of different lengths and negates the need for any padding or truncation when the encoded text is not the fixed number of octets in length. The encoding of the text in the Information-Element Data can be done in a number of novel ways, which will be described in detail below.

The new Information-Element-Identifier IE that is added to an SMS message in this implementation will hereinafter be referred to as the "Free-format text source ID". The value/code point for the Free-format text source ID will hereinafter be considered to be 26, which is currently the next available value/code-point according to 3GPP TS 23.040. However, this name and this value/code-point are provided for illustration purposes only, and other names and value/code-points could be used.

The TP-OA is a mandatory field in that the TP-OA must be present in an SMS message. Therefore, the TP-OA must be populated in some way in a message sent from a sending entity to a receiving entity. However, the TP-OA can have an Address-Value field of zero length, and the ToN and NPI fields can be populated with legal code points that are irrelevant since there is no address to which they apply. In such a case, a receiving entity would display to the end user only the contents of the Free-format text source ID IE and not the contents of the address from the TP-OA field, since there would be no contents.

Alternatively, the TP-OA can be populated with a dummy address, such as "0", or with a routable address using an allowed numbering form, such as an E.164 number or a short code, or could be populated using the existing GSM default alphabet-based alphanumeric method. In any such case, the decoded Address-Value field may optionally be presented by the receiving entity to the end user in addition to the new Free-format text source ID IE. Displaying the contents of both the Address-Value field and the Free-format text source ID could be useful for reasons of security. For example, a company name could be matched to its publicly advertised telephone number. Displaying the contents of both fields could also allow the source address to be mapped to an address book entry, if an address book and matching entry exist within the receiving entity. Populating the TP-OA with a routable address may also be useful in providing a more backwards compatible implementation. That is, such populating could enable a reply SMS message to be created on the receiving entity in response to a previously received SMS message, as per current standards and implementations.

The Free-format text source ID IE might be included only once in an SMS message and only once in a set of concatenated SMS messages or might be included more than once. If the Free-format text source ID IE is included more than once, then either one instance or all instances could be chosen by the receiving entity for display to the end user. One reason for including multiple instances of the Free-format text source ID might be to convey free-format text in different character encoding schemes for display to the end user by the receiving entity. Such encodings could represent the same or different characters. Another reason for including multiple instances of the Free-format text source ID might be to provide free-form text that is longer than that allowed in a single instance of the Free-format text source ID IE. If all instances of the Free-format text source ID contain the same value, or else if all instances of the Free-format text source ID would be displayed to the end user with the same characters after decoding, then only one instance needs to be displayed.

FIG. 9 illustrates changes that might be made to 3GPP TS 23.040, section 9.2.3.24 when only one instance of the Free-format text source ID is allowed. It can be seen at item 1010 that "Free-format text source ID" has been added at hex value 26. In previous versions of 3GPP TS 23.040, hex values 26-6F were reserved for future use and were the first values so reserved. Thus, hex value 26 is the first available value in the TP User Data field. With hex value 26 being used here for the Free-format text source ID, hex values 27-6F are now reserved for future use. The "no" value in the "Repeatability" column at item 1020 indicates that only one instance of the Free-format text source ID is allowed. A "yes" value at this location would indicate that more than one instance of the Free-format text source ID is allowed.

In various embodiments, at least two concepts are provided under implementation #4. The first concept uses the standards to define what encoding is used. That is, there is no selector ID. In addition, the presence or absence of the National Language Locking Shift IE and/or National Language Single Shift IE can be used to determine whether to use the default alphabet and/or its extension table (respectively) or the indicated National Language(s). Also, the type of encoding to be used could be implied by the encoding of the body text. In the second concept, there is a specific encoding selector ID conveying whether the GSM default alphabet, UCS2, or National Language table-based encoding is used. Alternatively, only "UCS2" or "GSM 7-bit encoding" might be specified, the latter of which is the default alphabet rather than any National Language if the National Language ID (wherever encoded) is set to 0. That is, if the Single Shift Table is set to 0, then the default alphabet is used. If the Locking Shift Table is set to 0 then the default 7-bit extension table is used.

More specifically, under the first concept, the National Language Single and/or Locking Shift table to use might be indicated in the National Language Single Shift IE 1030 and/or the National Language Locking Shift IE 1040 in the TP User Data field. Alternatively, this could be determined by one or two specific fields in the Free-format text source ID IE 1010. For example, the first octet or the last octet of the Free-format text source ID 1010 could be used.

Which of the above encoding options is used can be determined by the SMS standards, such as 3GPP TS 23.040 and/or 3GPP TS 23.038. The option could also be determined by the presence of the National Language Single Shift IE 1030 and/or the National Language Locking Shift IE 1040 in the TP User Data field of the SMS message. That is, when one or both of these IEs are present, then the encoding uses the National Language Single Shift table, the National Language Locking Shift table, or both, depending on which IEs are present. Otherwise, the GSM default alphabet or UCS2 is used.

To implement this concept, the following section, or similar wording, could be added to 3GPP TS 23.040:

"9.2.3.24.17 Free-format text source ID"

"This information element is used to indicate a free-format text as the source ID."

"The total length of the IE is x octets." or "The total length of the IE is variable."

"The text in this field is encoded according to 3GPP TS 23.038 GSM 7-bit default alphabet." or "The text in this field is encoded according to 3GPP TS 23.038 GSM 7-bit National Language tables, using the National Language Identifier(s) conveyed in the IEI fields for Locking Shift Table and/or Single Shift Table."

"A receiving entity shall ignore (i.e. skip over and commence processing at the next available information element) this information element if the value of the National Language Identifier in the "National Language Single Shift" IE or "National Language Locking Shift" IE is not described in 3GPP TS 23.038." or "The text in this field is encoded according to UCS2."

"This IE shall not be duplicated within the different segments of a concatenated message, but shall appear only once. In the event that this IE is duplicated within one segment of a concatenated message or a single message then a receiving entity shall use the last occurrence of the IE." or "This IE may be duplicated within a single message. If the contents of all of the instances of this IE are the same after decoding, then only one instance shall be chosen to be displayed to the end user. Otherwise, the contents shall be displayed to the end user concatenated together without any white space."

In the second concept under implementation #4, the Free-format text source ID is encoded using a combination of the GSM default alphabet, UCS2, and/or National Language table-based encoding. The National Language Single and/or Locking Shift table to use might be indicated in the National Language Single Shift IE 1030 and/or the National Language Locking Shift IE 1040 in the TP User Data Header field within the TP User Data field. Alternatively, this could be determined by one or two specific fields in the Free-formatted text source ID IE 1010. For example, the first octet or last octet of the Free-formatted text source ID IE 1010 could be used. To indicate the default alphabet table or default extension table to be used, a value of zero is inserted in the Locking Shift Table and/or Single Shift Table, respectively.

Which of the above encoding options is used might be determined by a specific field in the Free-formatted text source ID 1010, such as the first octet or last octet. The option could also be determined by the presence of the National Language Single Shift IE 1030 and/or National Language Locking Shift IE 1040 in the TP User Data Header field within the TP User Data field of the SMS message. That is, when one or both of these IEs are present, then the encoding uses the National Language Single Shift table, the National Language Locking Shift table, or both. Otherwise, the GSM default alphabet or UCS2 is used.

To implement this concept, the following section, or similar wording, could be added to 3GPP TS 23.040:

"9.2.3.24.17 Free-format text source ID"

"This information element is used to indicate a free-format text as the source ID."

"The encoding used for the text in this field is indicated in octet y:

Octet y: Encoding indicator"

"The encoding indicator can take one of the following values:"

| Value (decimal) | Meaning |
|---|---|
| 0 | 3GPP TS 23.038 GSM 7-bit default alphabet. |
| 1 | 3GPP TS 23.038 GSM 7-bit National Language tables, using the National Language Identifier(s) conveyed in the Locking Shift Table IE and/or Single Shift Table IE. See Note. |
| 2 | UCS2. |

NOTE:
The relevant table from the GSM 7-bit default alphabet shall be used in the absence of a National Language Locking Shift Table and/or Single Shift Table.

"If the value of the Encoding indicator field is set to 1 and if the value of the National Language Identifier in the 'National Language Single Shift' IE or 'National Language Locking Shift' IE is not described in 3GPP TS 23.038, or if 'National Language Single Shift' IE and 'National Language Locking Shift' IE are both absent, then a receiving entity shall ignore this information element (i.e., skip over and commence processing at the next available information element)."

or

"The encoding indicator can take one of the following values:"

| Value (decimal) | Meaning |
|---|---|
| 0 | 3GPP TS 23.038 GSM 7-bit using either the default alphabet or National Language tables using the National Language Identifier(s) conveyed in the Locking Shift Table IE and/or Single Shift Table IE if present. |
| 1 | UCS2. |

"If the value of the Encoding indicator field is set to 0 and if the value of the National Language Identifier in the 'National Language Single Shift' IE or 'National Language Locking Shift' IE is not described in 3GPP TS 23.038, or if 'National Language Single Shift' IE and 'National Language Locking Shift' IE are both absent, then a receiving entity shall ignore this information element (i.e., skip over and commence processing at the next available information element)."

"If the value of the Encoding indicator field is set to 0 and if the value of the National Language Identifier in the 'National Language Single Shift' IE and/or 'National Language Locking Shift' IE is 0 then the default GSM 7-bit alphabet and/or default extension table (respectively) shall be used."

"The total length of the IE is x octets." or "The total length of the IE is variable."

"This IE shall not be duplicated within the different segments of a concatenated message, but shall appear only once. In the event that this IE is duplicated within one segment of a concatenated message or a single message then a receiving entity shall use the last occurrence of the IE."

In implementation #5, a reserved string is used in the payload of the SMS message in order to permit a free-form text field to be conveyed as the source address. That is, as an alternative to or in addition to the value that is conveyed in the TP-OA field, a reserved string of characters is used to identify some text within the SMS message body (TP User Data) as the source address. The placement of the reserved string of characters in the SMS message body may or may not be limited. For example, the reserved string of characters may be placed at the beginning of the SMS message body, at the end of the SMS message body, or a fixed number of characters from the beginning of the SMS message body. The reserved text can be variable in length or fixed in length. The reserved text may specify how many characters in length the free-form text name of the source address is. Alternatively, the free-form text name of the source address can be delimited by another reserved string or by the end of the message. Alternatively, the free-form text name of the source address can have a fixed number of characters. All of these alternatives allow the receiving entity to be able to determine the end of the free-form text name of the source and thus return to usual processing.

One example of such reserved text might be: "<source-name>This is the free-format source name</source-name>". Another example might be "<source-name-35> This is the free-format source name". Another example might be "<source-name>This is the free-format source name". In the last example, it is assumed that a fixed length of 35 characters is allowed.

In these examples, the "<" and ">" characters are used as delimiters for the reserved text, but other characters or sets of characters could be used as a delimiters. The coding of these reserved strings will be the same as that used in the SMS message body (TP User Data) and as specified in 3GPP TS 23.040 and 3GPP TS 23.038. Therefore, the encoding of the message body is implicitly used for the free-form text name of the source address.

In implementation #6, an appropriate field is used in an inserted RFC 822 formatted email header in order to permit a free-form text field to be conveyed as the source address. That is, as an alternative to or in addition to the value that is conveyed in the TP-OA field, an email header field is added to the SMS message by the sending entity as described in section 9.2.3.24.11 of 3GPP TS 23.040. A specific field within this email header field is used to convey the free-form text name of the source address to the receiving entity. The field may or may not contain an alternative coding scheme.

For example, the "FROM" field of the email header could be used to convey the source address. Optionally, the source of the SMS message as obtained from the TP-OA could be inserted in the email header. For example, if the TP-OA contains a telephone number, this could be conveyed along with the free-form text name of the source. For instance, the following could be conveyed: "This is the free-format source name"<tel:+1-912-555-000>. In other embodiments, fields other than the "FROM" field could be used for this purpose.

The coding scheme for the text might be as defined in Internet Engineering Task Force (IETF) Request for Comments (RFC) 2047 and/or IETF RFC 2184 and/or IETF RFC 2231, all of which allow for characters in addition to those in the GSM default alphabet.

In implementation #7, an appropriate field from an inserted vCard is used in order to permit a free-form text field to be conveyed as the source address. That is, as an alternative to or in addition to the value that is conveyed in the TP-OA field, a vCard field could be added to the SMS message by the sending entity as described in Annex E.10 of 3GPP TS 23.040. A specific field within this vCard header field is used to convey the free-form text name of the source address to the receiving entity. The field may or may not contain an alternative coding scheme.

For example, the "FN" (Full Name) or "ORG" (Organization name) fields of the vCard could be used to convey the source address. Optionally, the source of the SMS message as obtained from the TP-OA could be inserted in the vCard. For example, if the TP-OA contains a telephone number, the telephone number could be inserted in the "TEL" field. In other embodiments, fields other than the "FN" (Full Name) or "ORG" (Organization name) or "TEL" fields could be used for the above purposes.

The CHARSET parameter in vCard version 2.1 can be used to specify a character set different from that of the text in the body of the SMS message, such as UTF-8 or UTF-16. For vCard 3.0, it is not possible to specify a character set, as such a vCard uses the default of the container, such as an email header, when a vCard is attached to an email. Thus, the coding scheme used for a vCard 3.0 instance would be the coding scheme used for the SMS message body as per 3GPP TS 23.040 and 3GPP TS 23.038.

Figure 10:
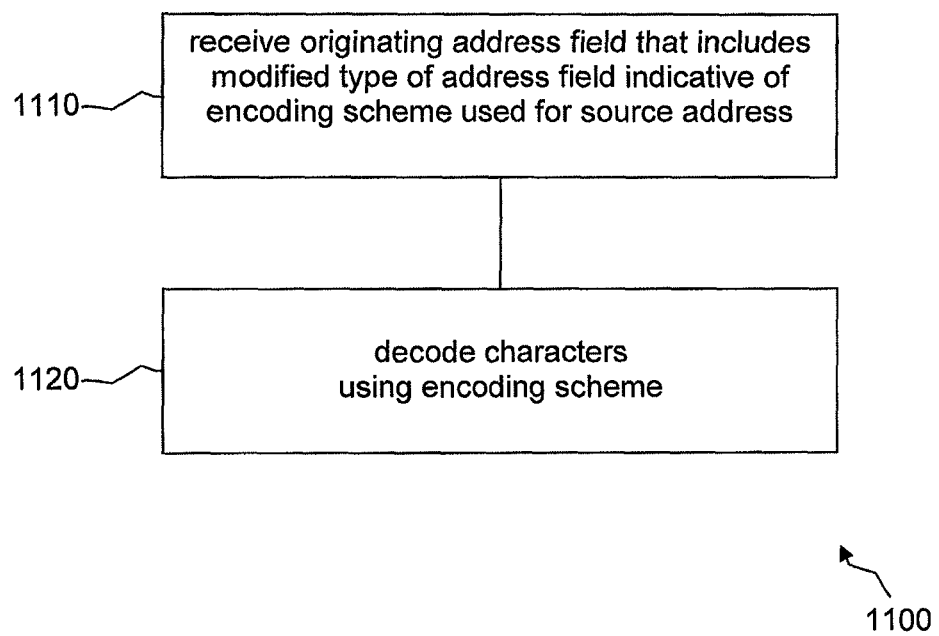
FIG. 10 illustrates a method for decoding characters that specify a source address of an SMS message, according to an embodiment of the disclosure.

The above discussion has focused on a network component encoding information related to its source address using an encoding scheme other than the GSM default alphabet. It should be understood that similar considerations could apply to a mobile device receiving an SMS message that has a source address encoded by an encoding scheme other than the GSM default alphabet and then decoding the source address. FIG. 10 illustrates an embodiment of a method 1100 for decoding characters that specify a source address of an SMS message. At box 1110, a mobile device receives an originating address field that includes a modified type of address field, the modification indicative of an encoding scheme used for the source address. At box 1120, the mobile device decodes the characters using the encoding scheme.

Figure 11:
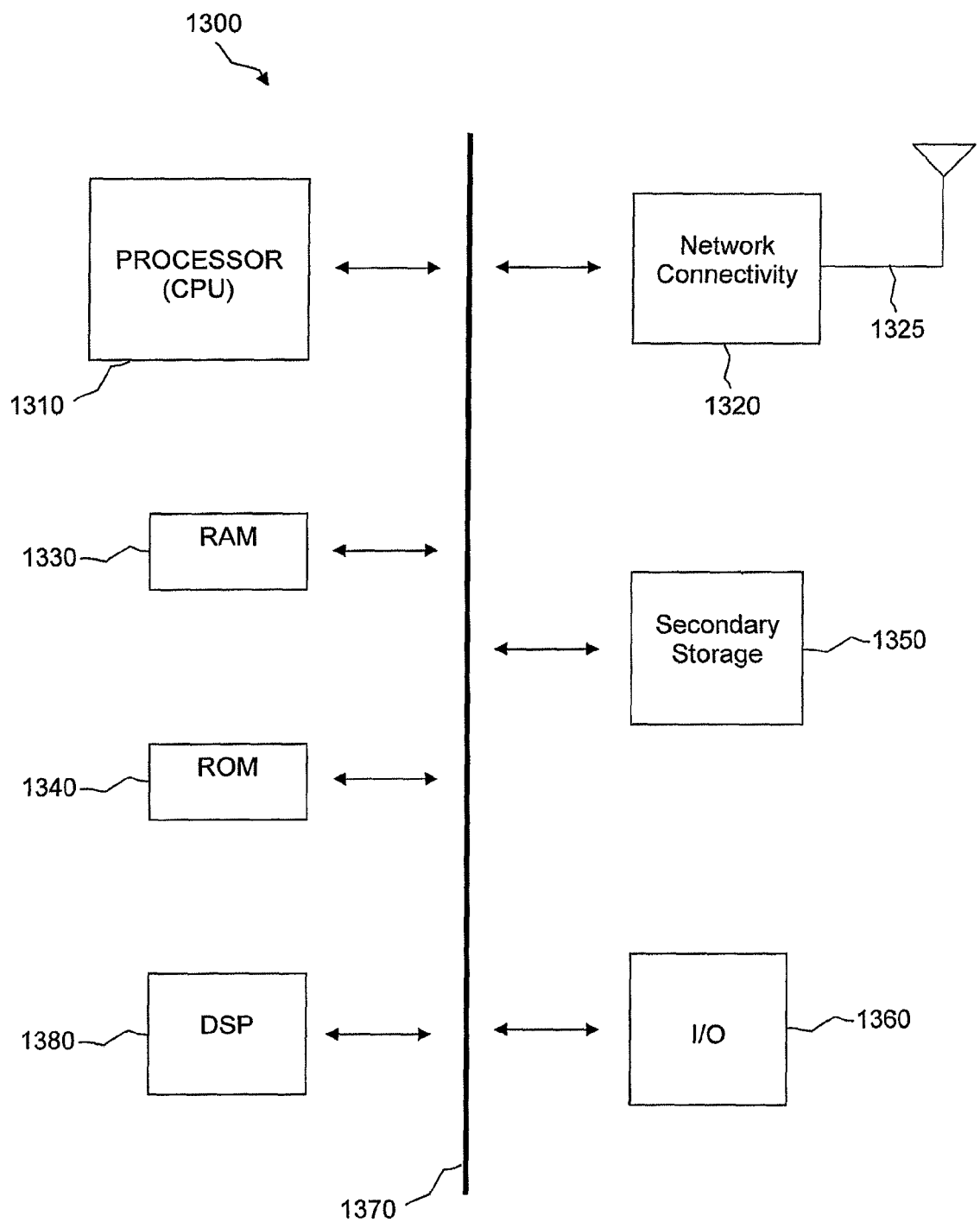
FIG. 11 illustrates a processor and related components suitable for implementing the several embodiments of the present disclosure.

The mobile device and other components described above might include a processing component that is capable of executing instructions related to the actions described above. FIG. 11 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for encoding characters that specify a source address of an SMS message. The method comprises modifying a type of address field within an originating address field, the modification indicative of an encoding scheme used for the source address of the SMS message.

In another embodiment, a method is provided for encoding characters that specify information related to a source address of an SMS message. The method comprises including the information related to the source address of the SMS message in an information element in the SMS message body, the information being encoded using at least one of a GSM default alphabet, UCS2-based encoding, and National Language table-based encoding.

In another embodiment, a method is provided for decoding characters that specify a source address of an SMS message. The method comprises receiving an originating address field that includes a modified type of address field, the modification indicative of an encoding scheme used for the source address of the SMS message. The method further comprises decoding the characters using the encoding scheme.

In another embodiment, a method is provided for decoding characters that specify information related to a source address of an SMS message. The method comprises receiving the information related to the source address of the SMS message in an information element in the SMS message body, the information having been encoded using at least one of a GSM default alphabet, UCS2-based encoding, and National Language table-based encoding. The method further comprises decoding the characters using the encoding scheme.

In another embodiment, a network component is provided. The network component includes a processor configured such that the network component modifies a type of address field within an originating address field of an SMS message, the modification indicative of an encoding scheme used for a source address of the SMS message.

In another embodiment, a network component is provided. The network component includes a processor configured such that the network component includes information related to a source address of an SMS message in an information element in the SMS message body. The information is encoded using at least one of a GSM default alphabet, UCS2-based encoding, and National Language table-based encoding.

In another embodiment, a mobile device is provided. The mobile device includes a processor configured such that the mobile device receives an originating address field of an SMS message, the originating address field including a modified type of address field, the modification indicative of an encoding scheme used for a source address of the SMS message.

In another embodiment, a mobile device is provided. The mobile device includes a processor configured such that the mobile device receives, in an information element in an SMS message body, information related to a source address associated with the SMS message, the information having been encoded using at least one of a GSM default alphabet, UCS2-based encoding, and National Language table-based encoding.

The following are incorporated herein by reference for all purposes: 3GPP TS 23.038, 3GPP TS 23.040, 3GPP TS 24.008, 3GPP TS 24.301, 3GPP TS 24.011, and 3GPP TS 29.002.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A network component, comprising:
   a processor configured to:
   provide a first indicator in an originating address field of a short message service (SMS) message, the first indicator indicating an alternative encoding scheme is used for a source address of the SMS message and a location of a second indicator indicating the alternative encoding scheme,
   wherein the alternative encoding scheme is Universal Character Set (UCS2)-based encoding National Language table-based encoding;
   encode the source address using the alternative encoding scheme; and
   transmit the SMS message with the first indicator, the second indicator, and the encoded source address;
   wherein the first indicator comprises a binary value indicating that the location of the second indicator is an extension portion that specifies which of the alternative encoding schemes is to be used, and
   wherein the extension portion is:
   an octet following the type of address field; or
   a new information element in the SMS message body.

2. The network component of claim 1, wherein the second indicator comprises a binary value.

3. The network component of claim 1, wherein the extension portion replaces a numbering plan identification portion of the originating address field.

4. The network component of claim 1, wherein the first indicator comprises a binary value indicating that the encoding scheme is located in a numbering plan identification portion of the originating address field.

5. The network component of claim 1, wherein information related to the source address is included in an information element in the SMS message body, the information related to the source address being encoded using one of:
   a Global System for Mobile communications (GSM) default alphabet;
   Universal Character Set (UCS2)-based encoding; and
   National Language table-based encoding.

6. The network component of claim 1, wherein information related to the source address is included in a reserved string in the SMS message body, the information related to the source address being encoded using one of:
   a GSM default alphabet;
   Universal Character Set (UCS2)-based encoding; and
   National Language table-based encoding.

7. A mobile device, comprising:
   a processor configured to:
   receive an originating address field in a short message service (SMS) message, the originating address field including a first indicator, the first indicator indicating an alternative encoding scheme is used for a source address of the SMS message and a location of a second indicator indicating the alternative encoding scheme,
   wherein the alternative encoding scheme is Universal Character Set (UCS2)-based encoding National or Language table-based encoding;
   decode the source address based on the second indicator and the alternative encoding scheme,
   wherein the first indicator comprises a binary value indicating that the location of the second indicator is an extension portion that specifies which of the alternative encoding schemes is to be used, and
   wherein the extension portion is:
   an octet following the type of address field; or
   a new information element in the SMS message body.

8. The mobile device of claim 7, wherein the second indicator comprises a binary value indicating which of the alternative encoding schemes is to be used.

9. The mobile device of claim 7, wherein the extension portion replaces a numbering plan identification portion of the originating address field.

10. The mobile device of claim 7, wherein the first indicator comprises a binary value indicating that the encoding scheme is located in a numbering plan identification portion of the originating address field.

11. The mobile device of claim 7, wherein information related to the source address is included in an information element in the SMS message body, the information related to the source address being encoded using one of:
    a Global System for Mobile communications (GSM) default alphabet;
    Universal Character Set (UCS2)-based encoding; and
    National Language table-based encoding.

12. The mobile device of claim 7, wherein information related to the source address is included in a reserved string in the SMS message body, the information related to the source address being encoded using one of:
    a GSM default alphabet;
    Universal Character Set (UCS2)-based encoding; and
    National Language table-based encoding.

* * * * *